US010438429B2

(12) United States Patent
Hayashi

(10) Patent No.: US 10,438,429 B2
(45) Date of Patent: Oct. 8, 2019

(54) ON-VEHICLE DEVICE, MOBILE DEVICE, AND VEHICLE WIRELESS COMMUNICATION SYSTEM

(71) Applicant: Panasonic Intellectual Property Management Co., Ltd., Osaka (JP)

(72) Inventor: Naoki Hayashi, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/991,825

(22) Filed: May 29, 2018

(65) Prior Publication Data

US 2018/0276925 A1 Sep. 27, 2018

Related U.S. Application Data

(63) Continuation of application No. PCT/JP2016/005067, filed on Dec. 6, 2016.

(30) Foreign Application Priority Data

Dec. 10, 2015 (JP) .................................. 2015-241435

(51) Int. Cl.
*G07C 9/00* (2006.01)
*H04W 4/48* (2018.01)
(Continued)

(52) U.S. Cl.
CPC ...... *G07C 9/00309* (2013.01); *G07C 9/00111* (2013.01); *H04Q 9/00* (2013.01);
(Continued)

(58) Field of Classification Search
None
See application file for complete search history.

(56) References Cited

U.S. PATENT DOCUMENTS

2005/0258936 A1* 11/2005 Ghabra ................. B60R 25/245
340/5.72
2016/0042579 A1* 2/2016 Austen ............... G07C 9/00309
340/5.61

FOREIGN PATENT DOCUMENTS

CN 102708605 A 10/2012
JP 2011-052506 A 3/2011

OTHER PUBLICATIONS

International Search Report of PCT application No. PCT/JP2016/005067 dated Feb. 14, 2017.
(Continued)

*Primary Examiner* — Daniell L Negron
(74) *Attorney, Agent, or Firm* — Seed IP Law Group LLP

(57) ABSTRACT

An on-vehicle device includes: a transmitter that transmits a request signal and a first measurement signal to a mobile device; and a receiver that receives a first response signal including information related to transmission strength of a second measurement signal from the mobile device that has received the request signal and the first measurement signal transmitted from the transmitter. The transmitter transmits to the mobile device the second measurement signal to which transmission strength has been set based on the information related to the transmission strength included in the first response signal received by the receiver. The receiver receives a second response signal. The second response signal is transmitted by the mobile device based on a result of determining the second measurement signal.

10 Claims, 10 Drawing Sheets

(51) Int. Cl.
*H04Q 9/00* (2006.01)
*B60R 25/24* (2013.01)
*H04W 4/04* (2009.01)

(52) U.S. Cl.
CPC ............... *H04W 4/04* (2013.01); *H04W 4/48* (2018.02); *B60R 25/24* (2013.01); *G07C 2009/00396* (2013.01); *G07C 2009/00555* (2013.01); *H04Q 2209/40* (2013.01); *H04Q 2209/50* (2013.01)

(56) References Cited

OTHER PUBLICATIONS

English Translation of Chinese Search Report dated May 8, 2019 for the related Chinese Patent Application No. 201680070595.5.
English Translation of the First Office Action dated May 8, 2019 for the related Chinese Patent Application No. 201680070595.5.

\* cited by examiner

ON-VEHICLE DEVICE

FIRST REPEATER

SECOND REPEATER

MOBILE DEVICE

52

| RECEPTION STRENGTH RANGE | TRANSMISSION STRENGTH | RANDOM VALUE |
|---|---|---|
| A | −50% | 0000 ~ 2499 |
| B | −25% | 2500 ~ 4999 |
| C | +25% | 5000 ~ 7499 |
| D | +50% | 7500 ~ 9999 |

64

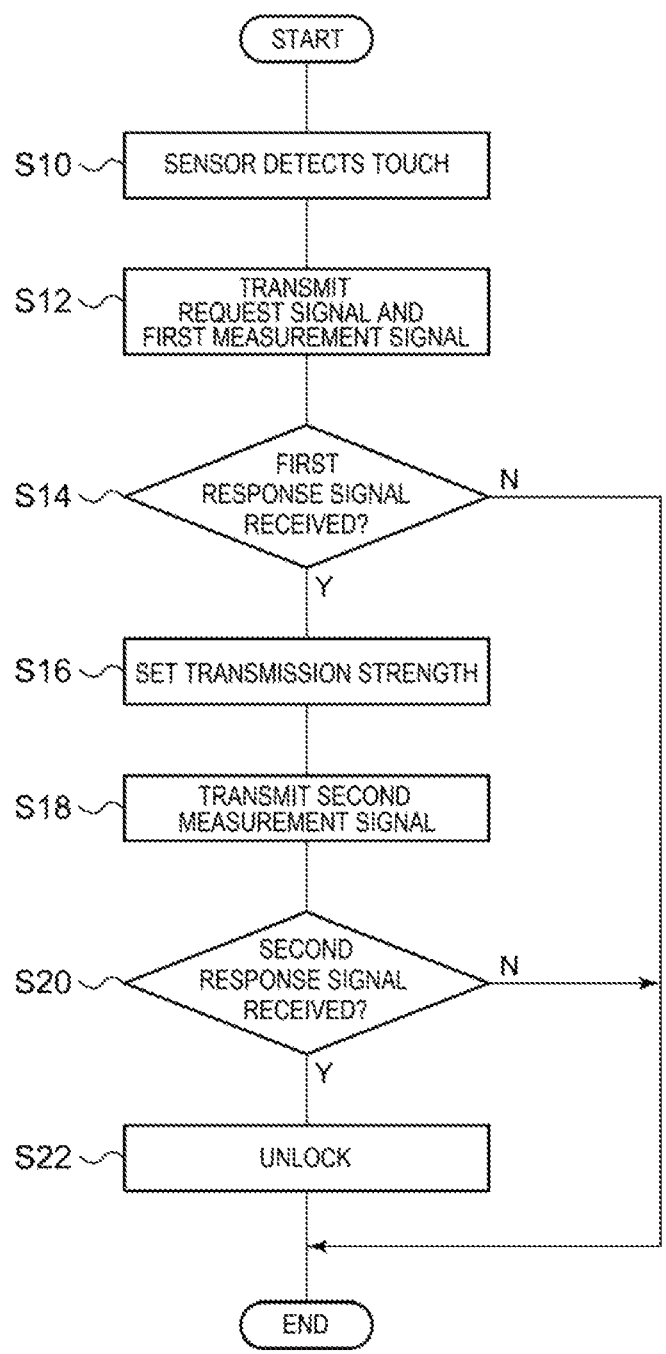

ON-VEHICLE DEVICE, MOBILE DEVICE, AND VEHICLE WIRELESS COMMUNICATION SYSTEM

This application is a continuation application of the PCT International Application No. PCT/JP2016/005067 filed on Dec. 6, 2016, which claims the benefit of foreign priority of Japanese patent application 2015-241435 filed on Dec. 10, 2015, the contents all of which are incorporated herein by reference.

BACKGROUND

1. Technical Field

The present disclosure relates to a communication technique. More particularly, the present disclosure relates to an on-vehicle device that executes communication between the on-vehicle device mounted on a vehicle and a mobile device possessed by a user, the mobile device, and a vehicle wireless communication system.

2. Description of the Related Art

Electronic key systems include a key operation free system that does not need a button operation of an electronic key. In this system, a communication area for a request in a low frequency (LF) band is formed around a vehicle. When the electronic key enters this communication area and receives a request, the electronic key returns a response in a radio-frequency (RF) band to a vehicle. Unauthorized use of the key operation free system includes a relay attack. In the relay attack, a malicious third party uses a repeater that can relay a request from a vehicle and a response from an electronic key. Therefore, even when the electronic key is not in a communication area of the vehicle, communication can be performed between two parties. To prevent the relay attack, a signal strength pattern is defined between the vehicle and the electronic key, and verification of the signal strength pattern is performed (see, for example, Unexamined Japanese Patent Publication No. 2011-52506).

SUMMARY

The present disclosure provides a technique that reduces a risk of a relay attack related to door unlocking.

An on-vehicle device according to one aspect of the present disclosure includes: a transmitter that transmits a request signal and a first measurement signal to a mobile device; and a receiver that receives a first response signal including information related to transmission strength of a second measurement signal from the mobile device that has received the request signal and the first measurement signal transmitted from the transmitter. The transmitter transmits to the mobile device the second measurement signal to which transmission strength has been set based on the information related to the transmission strength included in the first response signal received by the receiver. The receiver receives a second response signal. The second response signal is transmitted from the mobile device based on a result of determining the second measurement signal.

Another aspect of the present disclosure is a mobile device. This mobile device includes: a receiver that receives a request signal and a first measurement signal from an on-vehicle device; and a transmitter that, when the receiver receives the request signal and the first measurement signal, transmits to the on-vehicle device a first response signal including information related to transmission strength of a second measurement signal. The receiver receives the second measurement signal from the on-vehicle device according to the first response signal transmitted from transmitter. When reception strength of the second measurement signal received by the receiver matches the information related to the transmission strength included in the first response signal, the transmitter transmits a second response signal to the on-vehicle device.

Still another aspect of the present disclosure is a vehicle wireless communication system. This vehicle wireless communication system includes: an on-vehicle device that transmits a request signal and a first measurement signal; and a mobile device that, when receiving the request signal and the first measurement signal from the on-vehicle device, transmits to the on-vehicle device a first response signal including information related to transmission strength of a second measurement signal. The on-vehicle device transmits to the mobile device the second measurement signal to which transmission strength has been set based on the information related to the transmission strength included in the received first response signal. When reception strength of the received second measurement signal matches the information related to the transmission strength included in the first response signal, the mobile device transmits a second response signal to the on-vehicle device.

Any combinations of the above-described components and modifications of the aspects of the present disclosure in methods, devices, systems, recording media (including computer-readable non-transitory recording media) and computer programs are still effective as other aspects of the present disclosure.

According to the present disclosure, it is possible to reduce a risk of a relay attack related to door unlocking.

BRIEF DESCRIPTION OF DRAWINGS

FIG. 9 is a flowchart illustrating a communication procedure of the on-vehicle device in FIG. 3.

DETAILED DESCRIPTION

Figure 1A:
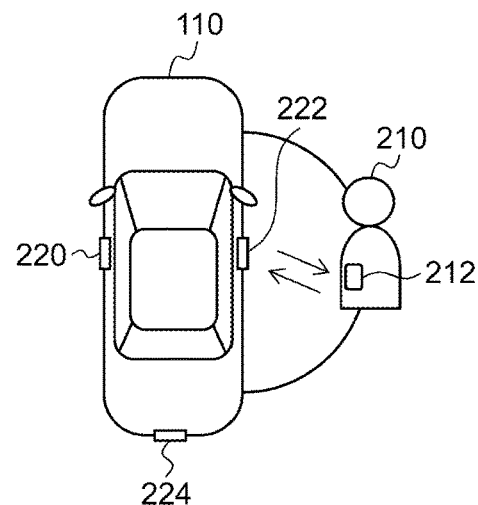
FIG. 1A is a view illustrating a configuration of a vehicle wireless communication system according to a comparative example of an exemplary embodiment of the present disclosure.

Prior to description of an exemplary embodiment of the present disclosure, problems found in a conventional technique is briefly described herein. A signal strength pattern defined between a vehicle and an electronic key is formed by combining a signal equal to or greater than a threshold and a signal smaller than the threshold. Hence, when the signal strength pattern and the threshold are found out, the signal strength pattern is easily reproduced, and a relay attack is easily made.

Prior to specific description of the exemplary embodiment of the present disclosure, an outline of the present disclosure will be described herein. The exemplary embodiment according to the present disclosure relates to a vehicle wireless communication system that executes communication for unlocking doors of a vehicle between an on-vehicle device that is mounted on the vehicle and a mobile device (electronic key) that is possessed by a user. As described above, an object of the present exemplary embodiment is to reduce a risk of a relay attack related to door unlocking. The on-vehicle device transmits a measurement signal (a measurement signal transmitted at this timing will be referred to as a "first measurement signal" hereinafter) subsequently to a request signal. When receiving the request signal, the mobile device wakes up, and measures reception strength of the first measurement signal. The mobile device determines transmission strength of a measurement signal (referred to as a "second measurement signal" hereinafter) that the on-vehicle device needs to transmit next, based on the measured reception strength. The mobile device transmits a response signal (a response signal transmitted at this timing will be referred to as a "first response signal" hereinafter) including information of the determined transmission strength.

When receiving the first response signal, the on-vehicle device extracts the information of the transmission strength included in the first response signal, and transmits the second measurement signal having the transmission strength according to the information of the transmission strength. The mobile device measures reception strength of the second measurement signal. When determining that the measured reception strength is within a predicted range of the reception strength predicted based on the information of the transmission strength included in the first response signal, the mobile device transmits a response signal (a response signal transmitted at this timing will be referred to as a "second response signal" hereinafter). When receiving the second response signal, the on-vehicle device unlocks the doors of the vehicle. The transmission strength of the second measurement signal transmitted from the on-vehicle device is instructed each time by the mobile device. This lowers the risk that a value of the transmission strength is found out. Further, determination is made based on the measured reception strength, and this makes reproduction difficult and makes a relay attack hard to do. In addition, although not described in detail in the present exemplary embodiment, the on-vehicle device may unlock the doors and then automatically open the unlocked doors.

Figure 1B:
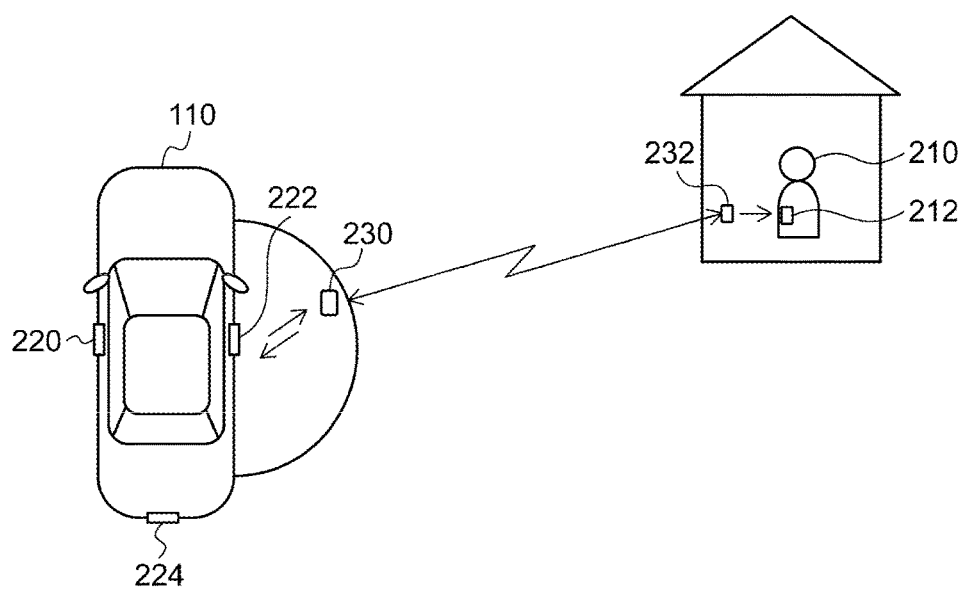
FIG. 1B is a view illustrating the configuration of the vehicle wireless communication system according to the comparative example of the exemplary embodiment of the present disclosure.

FIGS. 1A and 1B are views illustrating a configuration of vehicle wireless communication system 200 according to a comparative example of the exemplary embodiment of the present disclosure. FIG. 1A illustrates a normal unlocking operation of vehicle wireless communication system 200. Vehicle wireless communication system 200 includes left side antenna 220, right side antenna 222 and rear antenna 224 that are disposed in vehicle 110, and user 210 possesses mobile device 212. Further, left side antenna 220, right side antenna 222 and rear antenna 224 are connected with the on-vehicle device mounted on vehicle 110. In this regard, left side antenna 220, right side antenna 222 and rear antenna 224 transmit LF signals such as signals of a 125 kHz band, and mobile device 212 receives the LF signals. Further, mobile device 212 transmits ultra high frequency (UHF) signals such as signals of a 300 MHz band, and left side antenna 220, right side antenna 222 and rear antenna 224 receive the UHF signals.

Vehicle wireless communication system 200 corresponds to the above-described key operation free system. The key operation free system is also referred to as a smart entry system, a smart key system, or a passive keyless entry (PKE) system. In these systems, mobile device 212 receives the LF signal from the on-vehicle device mounted on vehicle 110, and returns the UHF signal when the LF signal is from the correct on-vehicle device. In such a way, mobile device 212 automatically makes a response, and causes vehicle 110 to unlock the doors. In addition, the LF signal and the UHF signal are encrypted, and it is difficult to decrypt data included in these signals. Further, a communication distance of the LF signal transmitted from the on-vehicle device is limited to a range of approximately 2 m from vehicle 110. Therefore, mobile device 212 distant from vehicle 110 does not make a response by mistake.

FIG. 1B illustrates an operation in a case where there is a relay attack on vehicle wireless communication system 200. For the relay attack, first repeater 230 and second repeater 232 are disposed between left side antenna 220, right side antenna 222 and rear antenna 224, and mobile device 212. In this regard, first repeater 230 and second repeater 232 are disposed by a third party other than user 210 who is an owner of vehicle 110. In the relay attack, first repeater 230 and second repeater 232 relay signals between the on-vehicle device and mobile device 212, and the doors of vehicle 110 are unlocked irrespectively of intention of user 210.

The LF signals transmitted from left side antenna 220, right side antenna 222, and rear antenna 224 are received by first repeater 230, and are converted into the UHF signals. The UHF signals from first repeater 230 are received by second repeater 232, and are converted into the LF signals. The LF signals from second repeater 232 are received by mobile device 212. Generally, the LF signal has a short communication distance and therefore the frequency is converted between first repeater 230 and second repeater 232 into a UHF signal having a long communication distance.

Figure 2A:
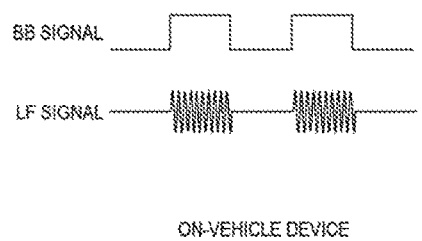
FIG. 2A is a view illustrating signals used by the vehicle wireless communication system in FIG. 1B.
Figure 2B:
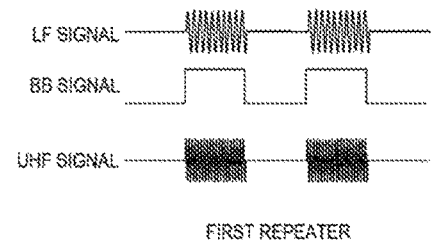
FIG. 2B is a view illustrating signals used by the vehicle wireless communication system in FIG. 1B.
Figure 2C:
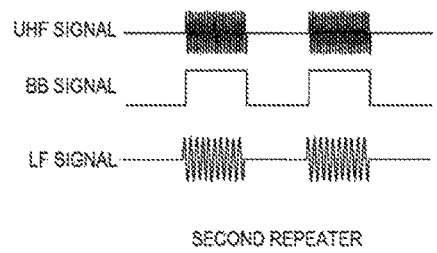
FIG. 2C is a view illustrating signals used by the vehicle wireless communication system in FIG. 1B.
Figure 2D:
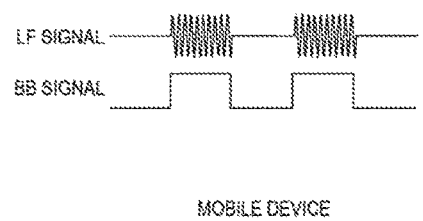
FIG. 2D is a view illustrating signals used by the vehicle wireless communication system in FIG. 1B.

The signals in this case will be described in more detail with reference to FIGS. 2A to 2D. FIGS. 2A to 2D are views illustrating signals used by vehicle wireless communication system 200 in FIG. 1B. Particularly, FIG. 2A illustrates the signals at the on-vehicle device. FIG. 2B illustrates the signals at first repeater 230. FIG. 2C illustrates the signals at second repeater 232. FIG. 2D illustrates the signals at mobile device 212. An upper part of FIG. 2A illustrates a baseband signal (BB signal) generated by the on-vehicle device. A lower part of FIG. 2A illustrates the LF signal modulated based on the baseband signal by the on-vehicle device. The LF signals are transmitted from left side antenna 220, right side antenna 222, and rear antenna 224.

An upper part of FIG. 2B illustrates the LF signal received by first repeater 230. A middle part of FIG. 2B illustrates the baseband signal obtained by demodulating the LF signal by first repeater 230. A lower part of FIG. 2B illustrates the UHF signal modulated based on the baseband signal by first repeater 230. The UHF signal is transmitted from first repeater 230. An upper part of FIG. 2C illustrates the UHF signal received by second repeater 232. A middle part of FIG. 2C illustrates the baseband signal obtained by demodulating the UHF signal by second repeater 232. A lower part of FIG. 2C illustrates the LF signal modulated based on the baseband signal by second repeater 232. The LF signal is transmitted from second repeater 232. An upper part of FIG. 2D illustrates the LF signal received by mobile device 212. A lower part of FIG. 2D illustrates the baseband signal obtained by demodulating the LF signal by mobile device 212. Description goes back to FIG. 1B.

On the other hand, the UHF signal from mobile device 212 may be relayed at second repeater 232 and first repeater 230 and received at left side antenna 220, right side antenna 222, and rear antenna 224, or may be directly received by left side antenna 220, right side antenna 222, and rear antenna 224 without being relayed. Thus, only by disposing first repeater 230 and second repeater 232 between the on-vehicle device and mobile device 212, the on-vehicle device and mobile device 212 execute the same process as the process in FIG. 1A. Consequently, even without analyzing the encryption at first repeater 230 and second repeater 232, it is possible to unlock vehicle 110.

Figure 3:
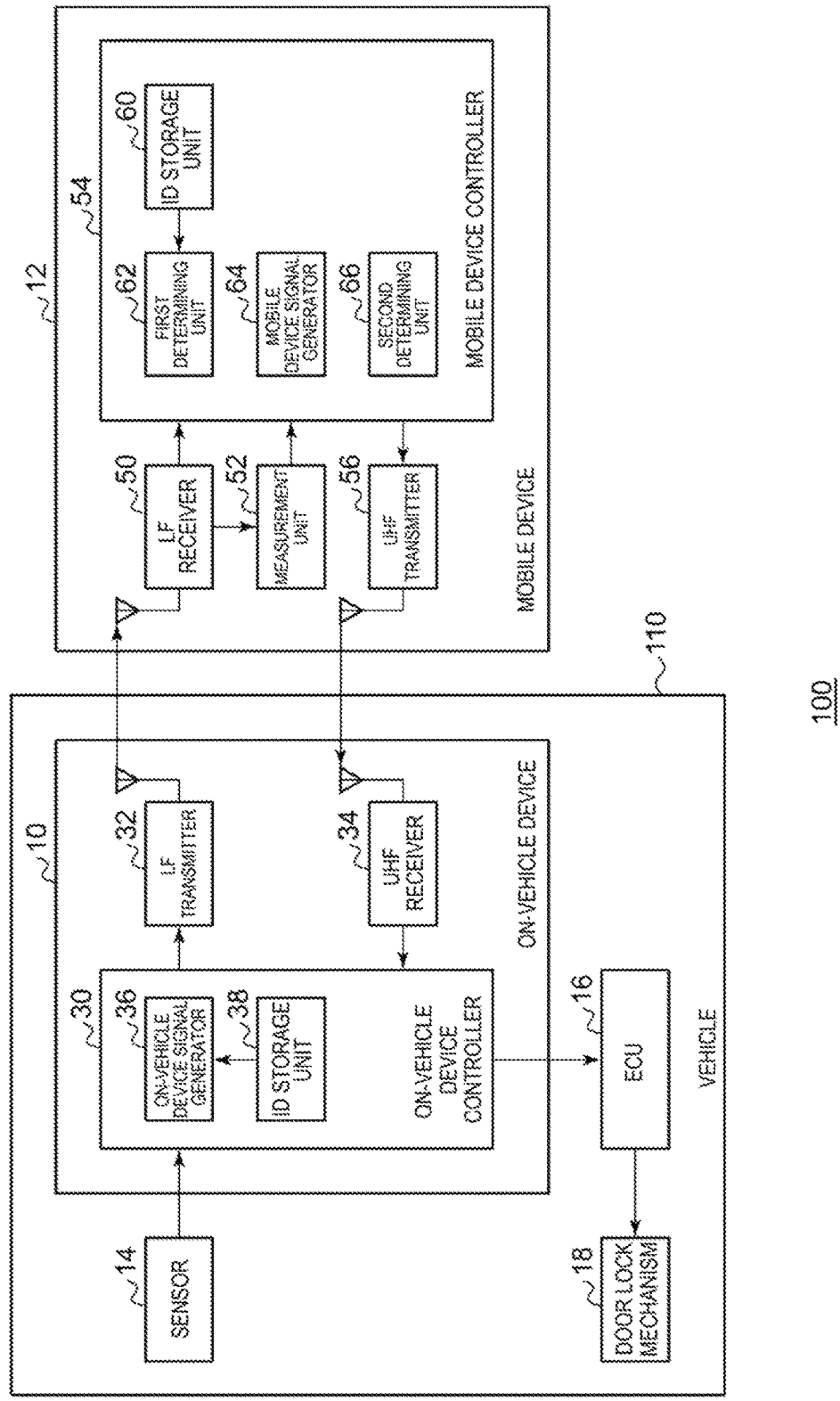
FIG. 3 is a view illustrating a configuration of a vehicle wireless communication system according to the exemplary embodiment of the present disclosure.

FIG. 3 is a view illustrating a configuration of vehicle wireless communication system 100 according to the exemplary embodiment of the present disclosure. Vehicle wireless communication system 100 includes vehicle 110, and mobile device 12. Vehicle 110 includes on-vehicle device 10, sensor 14, electronic control unit (ECU) 16 and door lock mechanism 18. On-vehicle device 10 includes on-vehicle device controller 30, LF transmitter 32, and UHF receiver 34. On-vehicle device controller 30 includes on-vehicle device signal generator 36 and identification (ID) storage unit 38. Mobile device 12 includes LF receiver 50, measurement unit 52, mobile device controller 54, and UHF transmitter 56. Mobile device controller 54 includes ID storage unit 60, first determining unit 62, mobile device signal generator 64, and second determining unit 66.

Sensor 14 of vehicle 110 is provided to, for example, a door knob of vehicle 110, and detects a user's touch. Any publicly known technique only needs to be used for sensor 14, and therefore, description of sensor 14 will be omitted herein. When detecting a touch, sensor 14 notifies on-vehicle device controller 30 of the detection.

When receiving a notification from sensor 14, on-vehicle device controller 30 of on-vehicle device 10 instructs on-vehicle device signal generator 36 to generate a signal. When receiving the instruction from on-vehicle device controller 30, on-vehicle device signal generator 36 extracts an ID stored in ID storage unit 38, and generates a request signal including the ID. This ID is identification information used for pair authentication with mobile device 12. In addition, when being included in the request signal, the ID may be encrypted. Further, the request signal generated by on-vehicle device signal generator 36 is a baseband signal. On-vehicle device signal generator 36 outputs the request signal to LF transmitter 32.

LF transmitter 32 receives the request signal from on-vehicle device signal generator 36. LF transmitter 32 executes a modulation process on the request signal to generate a request signal (that will be also referred to as the "request signal" hereinafter) of an LF signal. LF transmitter 32 transmits the request signal from an antenna to mobile device 12. In addition, the antenna connected with LF transmitter 32 and an antenna connected with UHF receiver 34 described below are disposed similar to left side antenna 220, right side antenna 222, and rear antenna 224 in FIGS. 1A and 1B. For example, left side antenna 220 includes the antenna connected with LF transmitter 32 and the antenna connected with UHF receiver 34, and is disposed on a left side of vehicle 110. Right side antenna 222 includes the antenna connected with LF transmitter 32 and the antenna connected with UHF receiver 34, and is disposed on a right side of vehicle 110. Rear antenna 224 includes the antenna connected with LF transmitter 32 and the antenna connected with UHF receiver 34, and is disposed on a rear side of vehicle 110.

Figure 4:
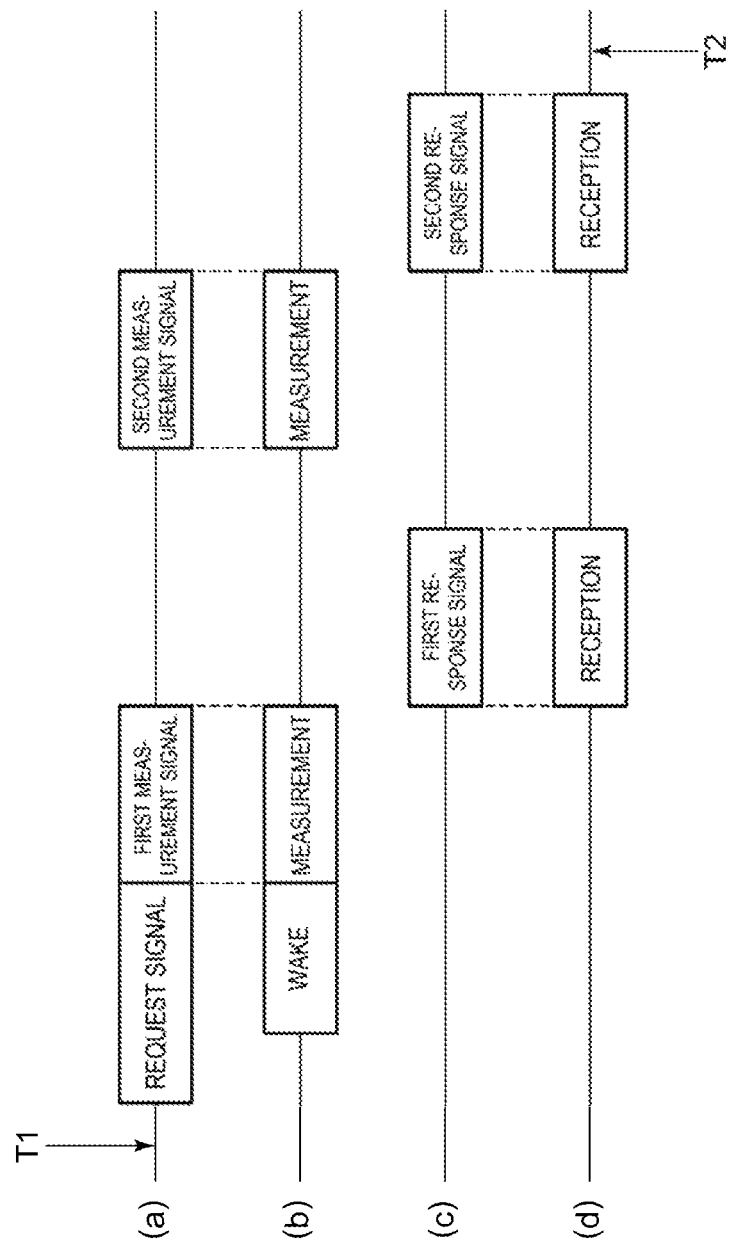
FIG. 4 is a view illustrating signals used by the vehicle wireless communication system in FIG. 3.
Figure 5:
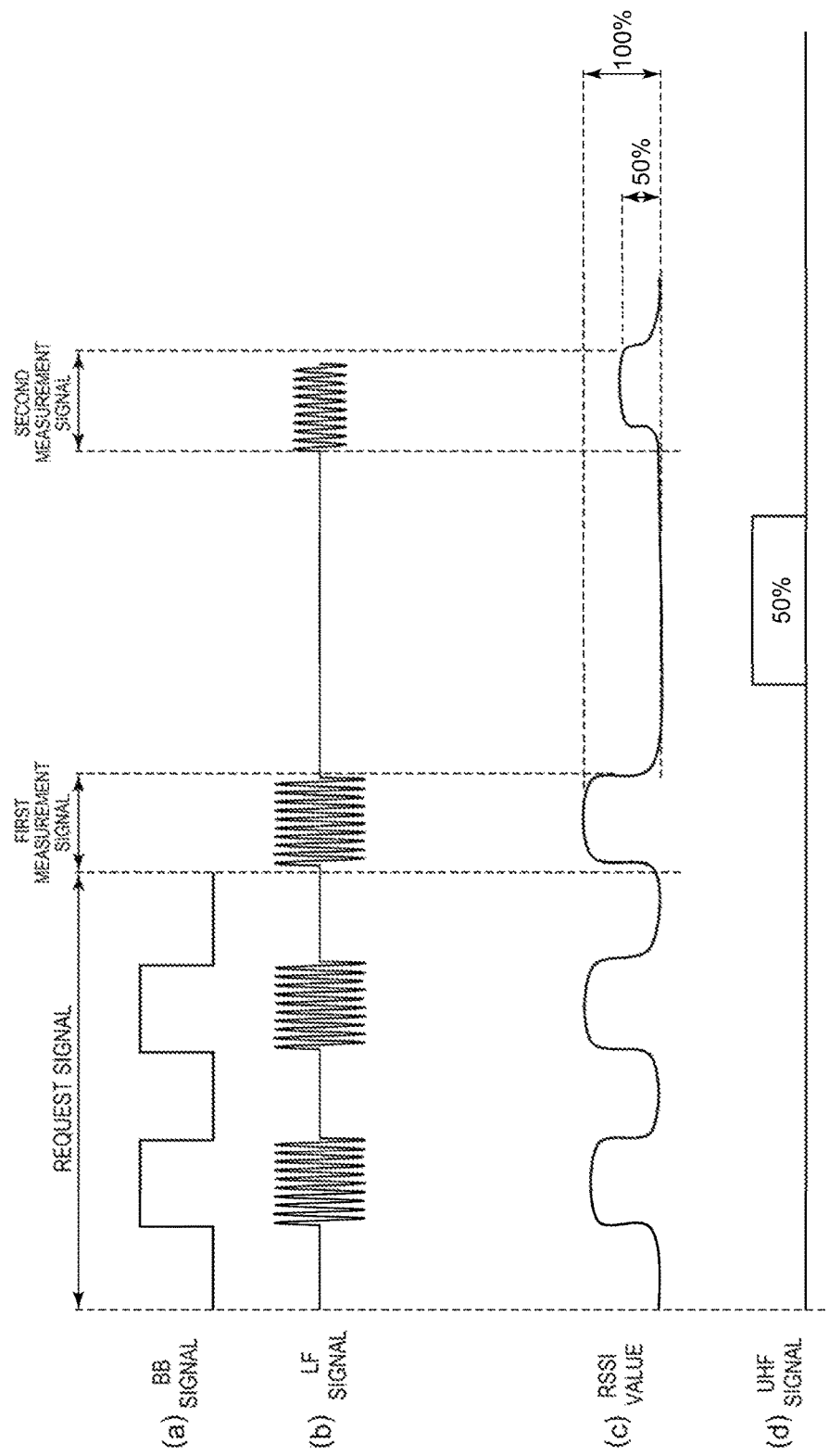
FIG. 5 is another view illustrating signals used by the vehicle wireless communication system in FIG. 3.

Further, LF transmitter 32 transmits the request signal and then transmits the first measurement signal to mobile device 12. The first measurement signal is a signal for causing mobile device 12 to measure reception strength, and is an LF signal. FIG. 4 is a view illustrating signals used by vehicle wireless communication system 100. Particularly, part (a) of FIG. 4 illustrates an LF signal transmitted from LF transmitter 32 of on-vehicle device 10. When receiving the notification from sensor 14 at timing "T1", on-vehicle device 10 successively transmits the request signal and the first measurement signal. Other points will be described below. FIG. 5 is another view illustrating signals used by vehicle wireless communication system 100. Part (a) of FIG. 5 illustrates a request signal generated by on-vehicle device signal generator 36. The request signal is a baseband signal as illustrated in part (a) of FIG. 5. Part (b) of FIG. 5 illustrates the LF signal transmitted from LF transmitter 32. As illustrated in part (b) of FIG. 5, the first measurement signal is transmitted subsequently to the request signal modulated to the LF signal. The other points will be described below, and the description returns to FIG. 3.

LF receiver 50 of mobile device 12 receives the request signal from on-vehicle device 10, and receives the first measurement signal from on-vehicle device 10. LF receiver 50 demodulates the received request signal, and generates a request signal (that will be also referred to as the "request signal" hereinafter) of a baseband signal. LF receiver 50 outputs the request signal to mobile device controller 54. When receiving the request signal from LF receiver 50, mobile device controller 54 wakes up mobile device 12.

Figures 6, 7:
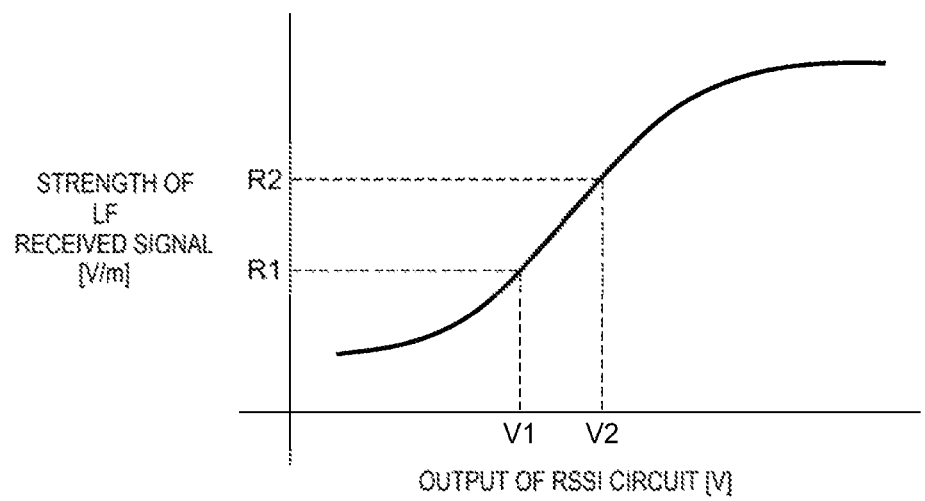
FIG. 6 is a view illustrating characteristics of a received signal strength indicator (RSSI) circuit included in a measurement unit in FIG. 3.
FIG. 7 is a view illustrating a data structure of a table stored in a mobile device signal generator in FIG. 3.

Subsequently, LF receiver 50 outputs the received first measurement signal to measurement unit 52. Measurement unit 52 measures reception strength of the first measurement signal such as a received signal strength indicator (RSSI). FIG. 6 is a view illustrating characteristics of an RSSI circuit included in measurement unit 52. As illustrated in FIG. 6, strength (electric field strength [V/m]) of the received LF signal is associated with an output (voltage [V]) of the RSSI circuit. For example, when the strength of the received LF signal is "R1", the RSSI circuit outputs "V1". When the strength of the LF received signal is "R2", the RSSI circuit outputs "V2". The description returns to FIG. 3. Measurement unit 52 outputs the measured reception strength to mobile device controller 54.

Part (b) of FIG. 4 illustrates a process of the LF signal received by LF receiver 50 of mobile device 12. A wake-up operation is executed upon receiving the request signal, and the first measurement signal is measured. Part (c) of FIG. 5 illustrates a measurement result of measurement unit 52 of mobile device 12. As illustrated, part of the request signal and the first measurement signal have higher reception strength when the LF signal is transmitted. The description returns to FIG. 3.

In mobile device controller 54, first determining unit 62 extracts an ID included in the request signal. Further, first determining unit 62 obtains the ID stored in ID storage unit 60. Furthermore, first determining unit 62 executes pair authentication based on the extracted ID and the obtained ID. Any publicly known technique only needs to be used for the pair authentication, and therefore, description of the pair authentication will be omitted herein. When the pair authentication fails, a process described below is not executed. On the other hand, when the pair authentication succeeds, the process described below is executed.

Mobile device signal generator 64 receives the reception strength from measurement unit 52. Mobile device signal generator 64 determines transmission strength with respect to transmission strength of the second measurement signal based on the reception strength. FIG. 7 is a view illustrating a data structure of a table stored in mobile device signal generator 64. "Reception strength range" indicates a range into which the reception strength measured by measurement unit 52 is classified. In addition, "A" indicates a range within which maximum reception strength is included. "D" indicates a range within which minimum reception strength is included. In addition, each of the reception strength ranges "A" to "D" is set based on the characteristics of the RSSI circuit included in measurement unit 52 illustrated in FIG. 6. Further, "transmission strength" is transmission strength associated with each reception strength range, and indicates the transmission strength of the second measurement signal. As the reception strength of each reception strength range becomes higher, a value of the transmission strength becomes smaller. In addition, the transmission strength "100%" corresponds to the transmission strength of the first measurement signal. A "random value" indicates a value for instructing each pieces of transmission strength. As illustrated in FIG. 7, a plurality of values is defined for one transmission strength, and one random value is selected from the plurality of values.

Mobile device signal generator 64 specifies the reception strength range within which the input reception strength is included, to specify the transmission strength. Further, mobile device signal generator 64 selects one value from the plurality of values associated with the specified transmission strength at random. The selected random value is information (referred to as "transmission strength information" hereinafter) related to the transmission strength of the second measurement signal. Therefore, it can be said that the transmission strength information is randomized information. The description returns to FIG. 3. Mobile device signal generator 64 generates the first response signal including information (referred to as "transmission strength information" hereinafter) related to the transmission strength of the second measurement signal. In addition, when being included in the first response signal, the transmission strength information may be encrypted. In addition, the first response signal generated by mobile device signal generator 64 is a baseband signal. Mobile device signal generator 64 outputs the first response signal to UHF transmitter 56.

UHF transmitter 56 receives the first response signal from mobile device signal generator 64. UHF transmitter 56 executes a modulation process on the first response signal to generate a first response signal (that will be also referred to as the "first response signal" hereinafter) of a UHF signal. UHF transmitter 56 transmits the first response signal from the antenna to on-vehicle device 10. Part (c) of FIG. 4 illustrates the UHF signal transmitted from UHF transmitter 56 of mobile device 12. The first measurement signal is received by mobile device 12, and then the first response signal is transmitted. Part (d) of FIG. 5 illustrates the first response signal transmitted from UHF transmitter 56 of mobile device 12. In this regard, for example, the transmission strength information is set to "50%". The description returns to FIG. 3.

UHF receiver 34 of on-vehicle device 10 receives the first response signal from mobile device 12. UHF receiver 34 demodulates the received first response signal to generate a first response signal (that will be also referred to as the "first response signal" hereinafter) of a baseband signal. UHF receiver 34 outputs the first response signal to on-vehicle device controller 30. Part (d) of FIG. 4 illustrates a process of the UHF signal received by UHF receiver 34 of on-vehicle device 10. As illustrated in part (d) of FIG. 4, the first response signal is received. The description returns to FIG. 3.

On-vehicle device controller 30 receives the first response signal from UHF receiver 34. On-vehicle device controller 30 extracts the transmission strength information included in the first response signal. On-vehicle device controller 30 stores the table illustrated in FIG. 7. When the transmission strength information is indicated by a random value, on-vehicle device controller 30 refers to the table and thereby converts the random value into the transmission strength. On-vehicle device controller 30 sets the transmission strength to LF transmitter 32. LF transmitter 32 transmits the second measurement signal to mobile device 12 based on the transmission strength set by on-vehicle device controller 30. In part (a) of FIG. 4, the second measurement signal is transmitted subsequently to the first response signal. Further, part (b) of FIG. 5 illustrates the second measurement signal set to 50% of the transmission strength of the first measurement signal. The description returns to FIG. 3.

LF receiver 50 of mobile device 12 receives the second measurement signal from on-vehicle device 10. LF receiver 50 outputs the received second measurement signal to measurement unit 52. Measurement unit 52 measures reception strength of the second measurement signal. Measurement unit 52 outputs the measured reception strength to mobile device controller 54. In part (b) of FIG. 4, the second measurement signal is measured. In part (c) in FIG. 5, reception strength that is 50% of the reception strength of the first measurement signal is measured for the second measurement signal. The description returns to FIG. 3.

Mobile device controller 54 receives a value such as "50%" of the transmission strength information generated by mobile device signal generator 64. Further, mobile device controller 54 multiplies the reception strength of the first measurement signal by the value of the transmission strength information to predict reception strength of the second measurement signal. Furthermore, mobile device controller 54 sets a predicted range around the predicted reception strength. In this regard, the predicted range is set from, for example, a subtraction result to an addition result by subtracting a fixed value from the predicted reception strength and adding the fixed value to the predicted reception strength.

After the predicted range is set in this way, mobile device controller 54 checks whether or not the reception strength of the second measurement signal input from measurement unit 52 is within the predicted range. When the reception strength is not within the predicted range, a process described below is not executed. On the other hand, when the reception strength is within the predicted range, the process described below is executed. When the reception strength is within the predicted range, mobile device signal generator 64 generates a second response signal. Hence, the second response signal is generated according to a determination result of the second measurement signal. The second response signal is a signal for notifying on-vehicle device 10 of that the reception strength is within the predicted range. Mobile device signal generator 64 outputs the second response signal to UHF transmitter 56.

UHF transmitter 56 receives the second response signal from mobile device signal generator 64. UHF transmitter 56 executes a modulation process on the second response signal to generate a second response signal (that will be also referred to as the "second response signal" hereinafter) of the UHF signal. UHF transmitter 56 transmits the second response signal from the antenna to on-vehicle device 10. In part (c) of FIG. 4, the second measurement signal is received by mobile device 12, and then the second response signal is transmitted. The description returns to FIG. 3.

UHF receiver 34 of on-vehicle device 10 receives the second response signal from mobile device 12. UHF receiver 34 demodulates the received second response signal to generate a second response signal (that will be also referred to as the "second response signal" hereinafter) of the baseband signal. UHF receiver 34 outputs the second response signal to on-vehicle device controller 30. As illustrated in part (d) of FIG. 4, the second response signal is received. The description returns to FIG. 3.

On-vehicle device controller 30 receives the second response signal from UHF receiver 34. When receiving the input of the second response signal, on-vehicle device controller 30 instructs ECU 16 of vehicle 110 to unlock door lock mechanism 18. Any publicly known technique only needs to be used for ECU 16 and door lock mechanism 18, and therefore description of those components will be omitted herein.

Hereinafter, a process of deriving the transmission strength of the second measurement signal from the reception strength of the first measurement signal in mobile device 12 will be described in more detail. As illustrated in FIG. 6, in measurement unit 52 of mobile device 12, the RSSI circuit saturates in a region in which received signal strength is high, and goes below a lower limit of measurement in an area in which the received signal strength is low and therefore cannot perform accurate measurement. In this regard, a case where received signal strength is high corresponds to a case where a distance between on-vehicle device 10 and mobile device 12 is short. A case where received signal strength is low corresponds to a case where a distance between on-vehicle device 10 and mobile device 12 is long. Hence, as described above, when the reception strength of the first measurement signal is high, mobile device signal generator 64 sets the transmission strength of the second measurement signal lower than the transmission strength of the first measurement signal. Further, when the reception strength of the first measurement signal is low, mobile device signal generator 64 sets the transmission strength of the second measurement signal higher than the transmission strength of the first measurement signal.

Figure 8A:
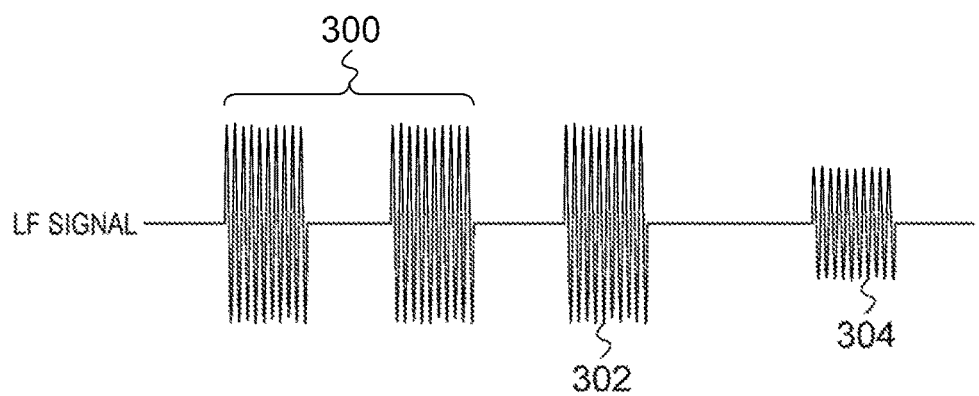
FIG. 8A is still another view illustrating signals used by the vehicle wireless communication system in FIG. 3.
Figure 8B:
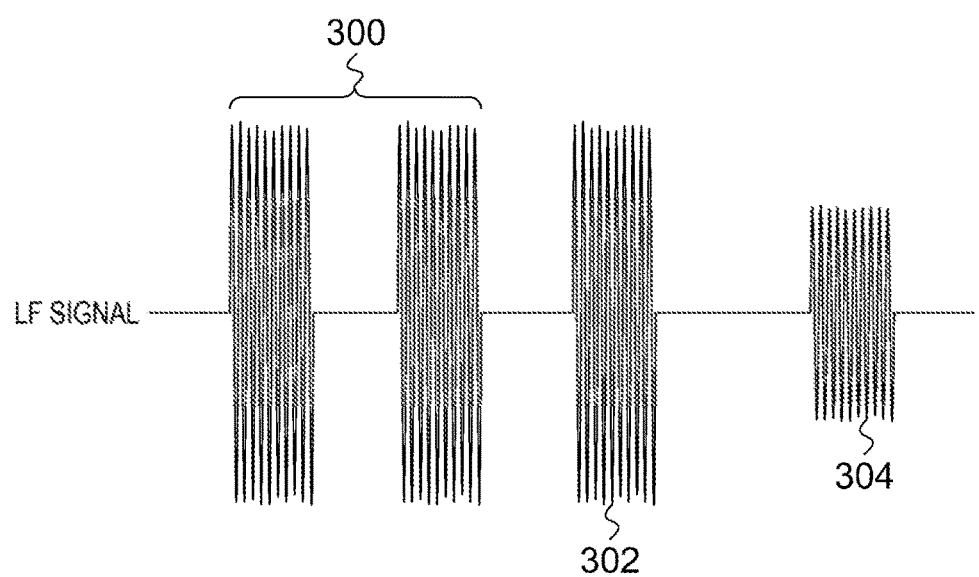
FIG. 8B is still another view illustrating signals used by the vehicle wireless communication system in FIG. 3.

FIGS. 8A to 8D are still other views illustrating signals used by vehicle wireless communication system 100. FIGS. 8A and 8B illustrate the case in which the distance between on-vehicle device 10 and mobile device 12 is short. FIG. 8A illustrates an LF signal transmitted from on-vehicle device 10. FIG. 8B illustrates an LF signal received by mobile device 12. As illustrated in FIG. 8A, on-vehicle device 10 transmits request signal 300 and first measurement signal 302. As illustrated in FIG. 8B, mobile device 12 receives request signal 300 and first measurement signal 302. Reception strength of first measurement signal 302 is high, and therefore as illustrated in FIG. 8A, mobile device 12 sets transmission strength of second measurement signal 304 to 50% of transmission strength of first measurement signal 302. As illustrated in FIG. 8B, second measurement signal 304 having lower reception strength than the reception strength of first measurement signal 302 is received by mobile device 12.

Figure 8C:
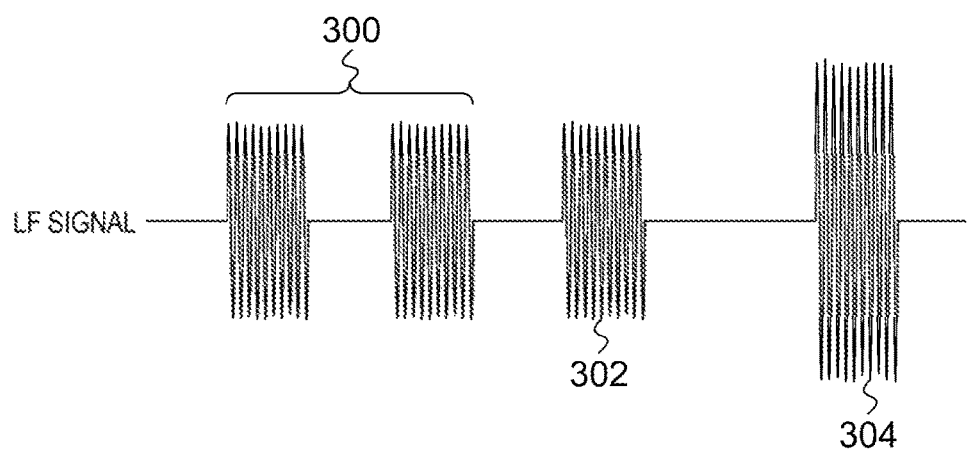
FIG. 8C is still another view illustrating signals used by the vehicle wireless communication system in FIG. 3.
Figure 8D:
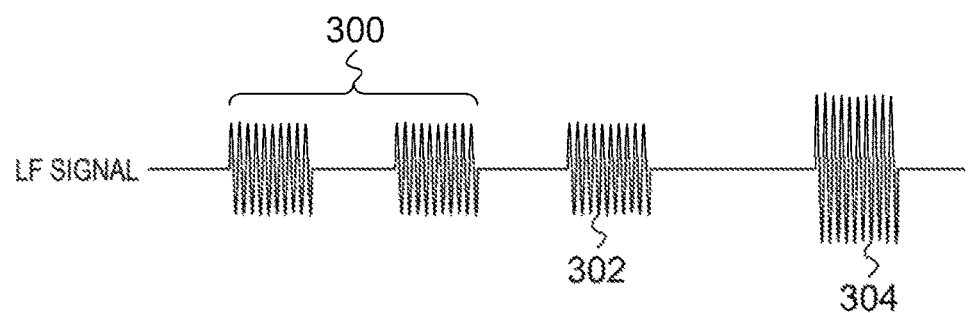
FIG. 8D is still another view illustrating signals used by the vehicle wireless communication system in FIG. 3.

FIGS. 8C and 8D illustrate the case in which the distance between on-vehicle device 10 and mobile device 12 is long. FIG. 8C illustrates an LF signal transmitted from on-vehicle device 10. FIG. 8D illustrates an LF signal received by mobile device 12. As illustrated in FIG. 8C, on-vehicle device 10 transmits request signal 300 and first measurement signal 302. As illustrated in FIG. 8D, mobile device 12 receives request signal 300 and first measurement signal 302. The reception strength of first measurement signal 302 is low, and therefore as illustrated in FIG. 8C, mobile device 12 sets the transmission strength of second measurement signal 304 to 150% of the transmission strength of first measurement signal 302. As illustrated in FIG. 8D, second measurement signal 304 having higher reception strength than the reception strength of first measurement signal 302 is received by mobile device 12.

This configuration can be achieved with a circuit including a computer central processing unit (CPU), a memory, and other large scale integration (LSI) of an arbitrary computer in terms of hardware and with a program loaded on the memory in terms of software. The drawings herein illustrate functional blocks achieved through coordination of these components. Hence, it will be understood by those skilled in the art that these functional blocks can be achieved in various forms by the hardware alone or by combinations of the hardware and the software.

An operation of vehicle wireless communication system 100 employing the above configuration will be described. FIG. 9 is a flowchart illustrating a communication procedure of on-vehicle device 10. Sensor 14 detects a touch (S10). LF transmitter 32 transmits a request signal and a first measurement signal (S12). When UHF receiver 34 receives the first response signal (Y in S14), on-vehicle device controller 30 sets transmission strength to LF transmitter 32 (S16), and transmits a second measurement signal (S18). When UHF receiver 34 receives a second response signal (Y in S20), ECU 16 causes door lock mechanism 18 to unlock (S22). When UHF receiver 34 does not receive the first response signal (N in S14) or when UHF receiver 34 does not receive the second response signal (N in S20), a process is finished.

Figure 10:
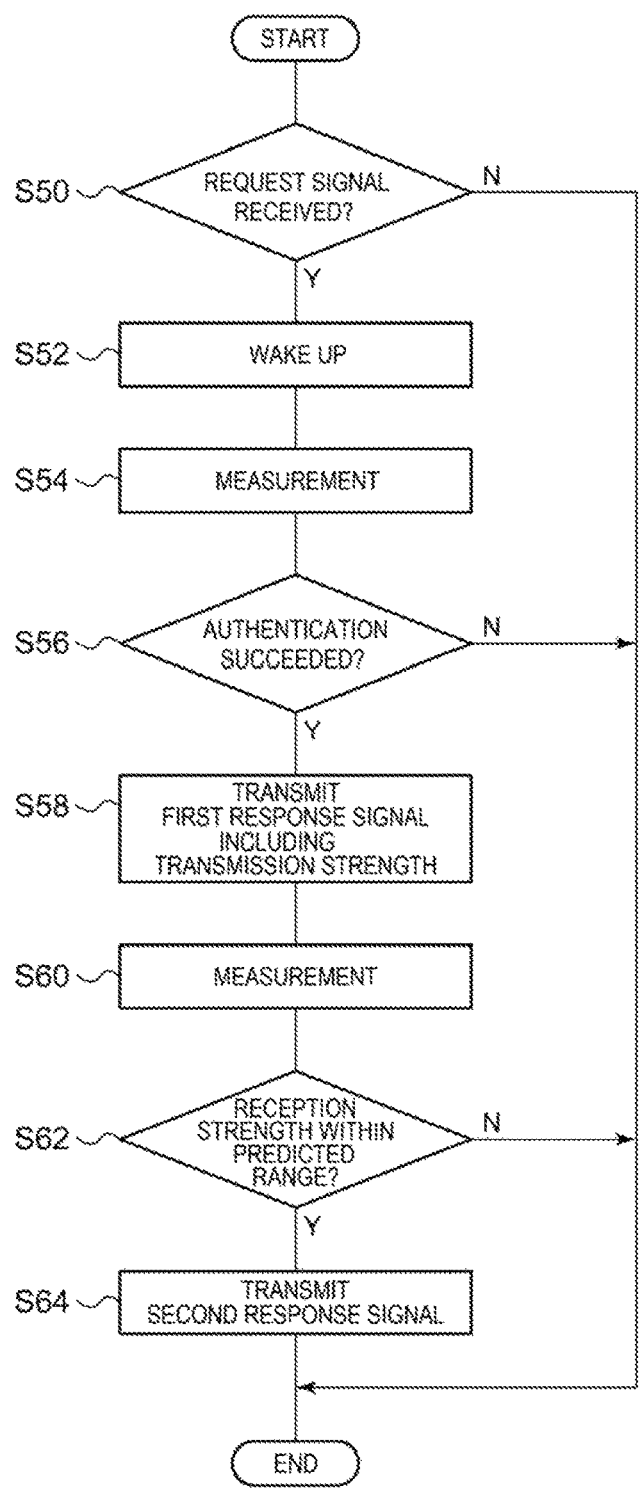
FIG. 10 is a flowchart illustrating a communication procedure of a mobile device in FIG. 3.

FIG. 10 is a flowchart illustrating a communication procedure of mobile device 12. When LF receiver 50 receives the request signal (Y in S50), mobile device controller 54 wakes up (S52). Measurement unit 52 measures reception strength of the first measurement signal (S54). When authentication succeeds in first determining unit 62 (Y in S56), UHF transmitter 56 transmits the first response signal including the transmission strength (S58). Measurement unit 52 measures reception strength of the second measurement signal (S60). When the reception strength is within a predicted range (Y in S62), UHF transmitter 56 transmits the second response signal (S64). In one of a case where LF receiver 50 does not receive the request signal (N in S50), a case where authentication does not succeed (N in S56) and a case where the reception strength is not within the predicted range (N in S62), the process is finished.

According to the exemplary embodiment of the present disclosure, the second measurement signal is transmitted according to measured strength instructed by mobile device 12, and the second response signal transmitted according to a determination result of the second measurement signal is received. Consequently, it is possible to cause mobile device 12 to make determination based on the reception strength of the second measurement signal. Further, mobile device 12 makes determination based on the reception strength of the second measurement signal, and this makes reproduction difficult. Furthermore, since reproduction is difficult, the risk of the relay attack is lowered.

Still further, when the reception strength of the second measurement signal matches information related to the transmission strength included in the first response signal, the second response signal is transmitted. Consequently, it is possible to make determination based on the reception strength. Moreover, the determination is made based on the reception strength, and this reduces the risk of the relay attack. Moreover, information related to the transmission strength is determined based on the reception strength of the first measurement signal, and this can set the transmission strength suitable for reception. Moreover, when the reception strength is high, the transmission strength is decreased, so that it is possible to suppress saturation. Moreover, when the reception strength is low, the transmission strength is increased, so that it is possible to prevent the reception strength from going below a reception lower limit. Moreover, the transmission strength information is randomized information, so that it is possible to improve safety.

An outline of an aspect of the present disclosure is as follows. An on-vehicle device according to one aspect of the present disclosure includes: a transmitter that transmits a request signal and a first measurement signal to a mobile device; and a receiver that receives a first response signal including information related to transmission strength of a second measurement signal from the mobile device that has received the request signal and the first measurement signal transmitted from the transmitter. The transmitter transmits to the mobile device the second measurement signal to which transmission strength has been set based on the information related to the transmission strength included in the first response signal received by the receiver. The receiver receives a second response signal. The second response signal is transmitted from the mobile device based on a result of determining the second measurement signal.

According to this aspect, the second measurement signal is transmitted according to instructed measured strength, and the second response signal transmitted according to a determination result of the second measurement signal is received. Consequently, it is possible to lower the risk of the relay attack.

Another aspect of the present disclosure is a mobile device. This mobile device includes: a receiver that receives a request signal and a first measurement signal from an on-vehicle device; and a transmitter that, when the receiver receives the request signal and the first measurement signal, transmits to the on-vehicle device a first response signal including information related to transmission strength of a second measurement signal. The receiver receives the second measurement signal from the on-vehicle device according to the first response signal transmitted from transmitter. When reception strength of the second measurement signal received by the receiver matches the information related to the transmission strength included in the first response signal, the transmitter transmits a second response signal to the on-vehicle device.

According to this aspect, when the reception strength of the received second measurement signal matches the information related to the transmission strength included in the first response signal, the transmitter transmits the second response signal. Consequently, it is possible to lower the risk of the relay attack.

The information related to the transmission strength included in the first response signal transmitted from the transmitter may be determined based on reception strength of the first measurement signal received by the receiver. In this case, information related to the transmission strength is determined based on the reception strength of the first measurement signal, so that it is possible to set the transmission strength suitable for reception.

The information related to the transmission strength included in the first response signal transmitted from the transmitter may be randomized information. In this case, the information related to the transmission strength is randomized information, so that it is possible to improve safety.

Still another aspect of the present disclosure is a vehicle wireless communication system. This vehicle wireless communication system includes: an on-vehicle device that transmits a request signal and a first measurement signal; and a mobile device that, when receiving the request signal and the first measurement signal from the on-vehicle device, transmits to the on-vehicle device a first response signal including information related to transmission strength of a second measurement signal. The on-vehicle device transmits to the mobile device the second measurement signal to which transmission strength has been set based on the information related to the transmission strength included in the received first response signal. When reception strength of the received second measurement signal matches the information related to the transmission strength included in the first response signal, the mobile device transmits a second response signal to the on-vehicle device.

According to this aspect, when the reception strength of the received second measurement signal matches the information related to the transmission strength included in the first response signal, the transmitter transmits a second response signal. Consequently, it is possible to lower the risk of the relay attack.

The present disclosure has been described based on the exemplary embodiment. It will be understood by those skilled in the art that the exemplary embodiment is merely example, other modifications in which components and/or processes of the exemplary embodiment are variously combined are possible, and the other modifications still fall within the scope of the present disclosure.

In the present exemplary embodiment, UHF transmitter 56 and UHF receiver 34 use UHF signals. However, UHF transmitter 56 and UHF receiver 34 are not limited to this, and may use signals having a higher frequency than the LF. This modification can improve a degree of freedom in configuration.

According to the present exemplary embodiment, the transmission strength information generated by mobile device signal generator 64 is set according to the reception strength of the first measurement signal measured by measurement unit 52. However, the transmission strength information is not limited to this, and may be set irrespectively of the reception strength of the first measurement signal measured by measurement unit 52. This modification can improve the degree of freedom in the configuration.

In the present exemplary embodiment, four stages of reception strength ranges are set to mobile device signal generator 64. However, mobile device signal generator 64 is not limited to this, and stages other than four stages of the reception strength ranges may be set to mobile device signal generator 64. This modification can improve the degree of freedom in the configuration.

The present exemplary embodiment has described vehicle wireless communication system 100 as a relay attack countermeasure related to door unlocking. However, vehicle wireless communication system 100 is not limited to this, and vehicle wireless communication system 100 that is the relay attack countermeasure may be applied to an engine start operation of a vehicle of a keyless entry system, for example. According to this modification, it is possible to reduce the risk of the relay attack during engine start of the vehicle.

An on-vehicle device, a mobile device, and a vehicle wireless communication system that include the on-vehicle device and the mobile device according to the present disclosure are effective for a keyless entry system used to unlock doors or start engines.

What is claimed is:

1. A vehicle wireless entry system comprising:
a vehicle including a sensor, a first transmitter coupled with a first antenna, a first receiver coupled with a second antenna, and a door lock mechanism,
a mobile device including a second receiver coupled with a third antenna, and a second transmitter coupled with a fourth antenna, wherein
when the sensor of the vehicle detects an input, the first transmitter of the vehicle transmits a request signal and a first measurement signal to the mobile device using the first antenna,
after the second receiver of the mobile device receives, using the third antenna, the request signal and the first measurement signal from the vehicle, the second transmitter of the mobile device transmits, using the fourth antenna, a first response signal including transmission strength information of a second measurement signal,
when the first receiver of the vehicle receives the first response signal using the second antenna, the first transmitter of the vehicle transmits, using the first antenna, the second measurement signal having a transmission strength corresponding to a transmission strength information of the first response signal,
after the second receiver of the mobile device receives the second measurement signal using the third antenna, when the mobile device makes an authentication of the vehicle based on a first receiving strength of the first measurement signal received by the second receiver of the mobile device, the transmission strength information of the second measurement signal transmitted by the second transmitter of the mobile device, and a second receiving strength of the second measurement signal received by the second receiver of the mobile device, the second transmitter of the mobile device transmits a second response signal using the fourth antenna of the mobile device,
when the first receiver of the vehicle receives the second response signal using the second antenna, the vehicle unlocks the door lock mechanism, after the second receiver of the mobile device receives the second measurement signal using the third antenna, when the mobile device does not make the authentication of the vehicle based on the first receiving strength of the first measurement signal, the transmission strength information of the first response signal, and the second receiving strength of the second measurement signal, the second transmitter does not transmit the second response signal using the fourth antenna, and
when the first receiver of the vehicle does not receive the second response signal using the second antenna, the vehicle does not unlock the door lock mechanism of the vehicle.

2. The vehicle wireless entry system according to claim 1, wherein
the authentication of the vehicle is defined as a second authentication of the vehicle, and wherein
after the second receiver of the mobile device receives the request signal and the first measurement signal from the vehicle using the third antenna, when the mobile device makes a first authentication of the vehicle, based on the request signal, the second transmitter of the mobile device transmits a first response signal including transmission strength information of a second measurement signal using the fourth antenna,
when the first receiver of the vehicle receives the first response signal using the second antenna, the first transmitter of the vehicle transmits the second measurement signal having a transmitting strength corresponding to the transmission strength information of the first response signal, using the first antenna,
after the second receiver of the mobile device receives the second measurement signal using the third antenna, when the mobile device makes the second authentication of the vehicle based on a first receiving strength of the first measurement signal received by the second receiver of the mobile device, the transmission strength information transmitted by the second transmitter of the mobile device, and a second receiving strength of the second measurement signal received by the second receiver of the mobile device, the second transmitter of the mobile device transmits a second response signal using the fourth antenna of the mobile device,
when the first receiver of the vehicle receives the second response signal using the second antenna, the vehicle unlocks the door lock mechanism,
after the second receiver of the mobile device receives the second measurement signal using the third antenna, when the mobile device does not make the second authentication of the vehicle based on the first receiving strength of the first measurement signal, the transmission strength information, and the second receiving strength of the second measurement signal, the second transmitter does not transmit the second response signal using the fourth antenna, and
when the first receiver of the vehicle does not receive the second response signal using the second antenna, the vehicle does not unlock the door lock mechanism of the vehicle.

3. The vehicle wireless entry system according to claim 1, wherein
the mobile device determines the transmission strength information of the second measurement signal included in the first response signal, based on the first receiving strength of the first measurement signal received through the third antenna.

4. The vehicle wireless entry system according to claim 3, wherein
the mobile device is configured to determine a first transmission strength information of the second measurement signal corresponding to the first transmission strength of the first measurement signal,
the mobile device is configured to determine second transmission strength information of the second measurement signal, corresponding to a second strength of the first measurement signal, and
when the first strength of the first measurement signal is larger than the second strength of the first measurement signal, a third strength indicated by the first transmission strength information is smaller than a fourth strength indicated by the second transmission strength information.

5. The vehicle wireless entry system according to claim 1, wherein
the mobile device determines the transmission strength information of the second measurement signal included in the first response signal, a strength indicated the transmission strength information being a random value.

6. A on-vehicle wireless entry system comprising:
an on-vehicle device configured to be mounted a vehicle, the vehicle including a sensor, a first antenna, a second antenna, and a door lock mechanism, the on-vehicle device including a first transmitter coupled with the first antenna, and a first receiver coupled with the second antenna,
a mobile device including a second receiver coupled with a third antenna, and a second transmitter coupled with a fourth antenna, wherein
when the sensor of the vehicle detects an input, the first transmitter of the on-vehicle device transmits a request signal and a first measurement signal to the mobile device using the first antenna,
after the second receiver of the mobile device receives the request signal and the first measurement signal from the vehicle using the third antenna, the second transmitter of the mobile device transmits a first response signal including transmission strength information of a second measurement signal using the fourth antenna,
when the first receiver of the on-vehicle device receives the first response signal using the second antenna, the first transmitter of the on-vehicle device transmits the second measurement signal having a transmission strength corresponding to a transmission strength information of the first response signal, using the first antenna,
after the second receiver of the mobile device receives the second measurement signal using the third antenna, when the mobile device makes an authentication of the vehicle based on a first receiving strength of the first measurement signal received by the second receiver of the mobile device, the transmission strength information of the second measurement signal transmitted by the second transmitter of the mobile device, and a second receiving strength of the second measurement signal received by the second receiver of the mobile device, the second transmitter of the mobile device transmits a second response signal using the fourth antenna of the mobile device,
when the first receiver of the on-vehicle device receives the second response signal using the second antenna, the on-vehicle device unlocks the door lock mechanism of the vehicle,
after the second receiver of the mobile device receives the second measurement signal using the third antenna, when the mobile device does not make the authentication of the vehicle based on the first receiving strength of the first measurement signal, the transmission strength information of the first response signal, and the second receiving strength of the second measurement signal, the second transmitter does not transmit the second response signal using the fourth antenna, and
when the first receiver of the vehicle does not receive the second response signal using the second antenna, the on-vehicle device does not unlock the door lock mechanism of the vehicle.

7. The on-vehicle wireless entry system according to claim 6, wherein
the authentication of the vehicle is defined as a second authentication of the on-vehicle device, and wherein
after the second receiver of the mobile device receives the request signal and the first measurement signal from the vehicle using the third antenna, when the mobile device makes a first authentication of the on-vehicle device, based on the request signal, the second transmitter of the mobile device transmits a first response signal including transmission strength information of a second measurement signal using the fourth antenna,
when the first receiver of the on-vehicle device receives the first response signal using the second antenna, the first transmitter of the on-vehicle device transmits the second measurement signal having a transmitting strength corresponding to the transmission strength information of the first response signal, using the first antenna,
after the second receiver of the mobile device receives the second measurement signal using the third antenna, when the mobile device makes the second authentication of the on-vehicle device based on a first receiving strength of the first measurement signal received by the second receiver of the mobile device, the transmission strength information transmitted by the second transmitter of the mobile device, and a second receiving strength of the second measurement signal received by the second receiver of the mobile device, the second transmitter of the mobile device transmits a second response signal using the fourth antenna of the mobile device,
when the first receiver of the on-vehicle device receives the second response signal using the second antenna, the on-vehicle device unlocks the door lock mechanism,
after the second receiver of the mobile device receives the second measurement signal using the third antenna, when the mobile device does not make the second authentication of the on-vehicle device based on the first receiving strength of the first measurement signal, the transmission strength information, and the second receiving strength of the second measurement signal, the second transmitter does not transmit the second response signal using the fourth antenna, and
when the first receiver of the on-vehicle device does not receive the second response signal using the second antenna, the on-vehicle device does not unlock the door lock mechanism of the vehicle.

8. The on-vehicle device wireless entry system according to claim 6, wherein
the mobile device determines the transmission strength information of the second measurement signal included in the first response signal, based on the first receiving strength of the first measurement signal received through the third antenna.

9. The on-vehicle device wireless entry system according to claim 8, wherein the mobile device is configured to determine a first transmission strength information of the second measurement signal corresponding to the first transmission strength of the first measurement signal, the mobile device is configured to determine second transmission strength information of the second measurement signal, corresponding to a second strength of the first measurement signal, and when the first strength of the first measurement signal is larger than the second strength of the first measurement signal, a third strength indicated by the first transmission strength information is smaller than a fourth strength indicated by the second transmission strength information.

10. The on-vehicle device wireless entry system according to claim 6, wherein the mobile device determines the transmission strength information of the second measurement signal included in the first response signal, a strength indicated the transmission strength information being a random value.

* * * * *